(12) United States Patent  
Schmidt

(10) Patent No.: US 6,694,319 B1  
(45) Date of Patent: *Feb. 17, 2004

(54) METHOD OF CHARACTERIZING VIDEO DATA, AND VIDEO DATA MEMORY COMPRISING MEANS FOR GENERATING A VIDEO DATA CODE

(75) Inventor: Adam Schmidt, Riedstadt (DE)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,138

(22) Filed: Apr. 30, 1998

(30) Foreign Application Priority Data

May 2, 1997 (DE) .......................... 197 18 658

(51) Int. Cl.⁷ ............................... G06F 17/30
(52) U.S. Cl. ........................ 707/101; 707/200
(58) Field of Search ............ 707/4, 100, 101, 707/104, 200, 104.1, 102; 386/65, 124, 125

(56) References Cited

U.S. PATENT DOCUMENTS

| | | | | |
|---|---|---|---|---|
| 5,613,057 A | * | 3/1997 | Caravel | 345/302 |
| 5,646,675 A | * | 7/1997 | Copriviza et al. | 348/1 |
| 5,699,472 A | * | 12/1997 | Ueda | 386/46 |
| 5,806,072 A | * | 9/1998 | Kuba et al. | 707/200 |
| 5,838,685 A | * | 11/1998 | Hochman | 370/428 |

* cited by examiner

*Primary Examiner*—Greta Robinson

(57) ABSTRACT

A method of characterising video data characterised by means of a characterising code. Preferably, the characterising code is a time code, in a video data memory, preferably a linear data storage unit, and a corresponding video data memory. According to the invention, the characterising code is converted into a video data code for the purpose of access to the video data by external units. Further, the video data code and the video data are arranged in video data files including names that contain at least parts of the relevant associated characterising code, and in which the video data files are arranged in directories, which contain at least parts of the relevant associated characterising code.

12 Claims, 2 Drawing Sheets

| Video-Daten-Code | New file name including directory info |
|---|---|
| 0002234511 | Day00/Hour02/Min23/Sec45/0002234511.jpg |
| 0002234512 | Day00/Hour02/Min23/Sec45/first.jpg |
| 0002234513 | Day00/Hour02/Min23/Sec45/touchdwn1.jpg |
| 0002234514 | Day00/Hour02/Min23/Sec45/touchdwn2.jpg |

METHOD OF CHARACTERIZING VIDEO DATA, AND VIDEO DATA MEMORY COMPRISING MEANS FOR GENERATING A VIDEO DATA CODE

BACKGROUND OF THE INVENTION

The invention relates to a method of characterizing video data which is characterized in a video data memory, preferably a linear data memory, by means of a characterizing code, preferably a time code, and to a video data memory in which such data are stored.

Video data memories that are known, for example video recorders, but also disk-based storage systems, usually characterize the video data by means of a characterizing code, usually a time code. This code characterizes each individual frame of the video data in an unequivocal manner. Each single frame can thus be reliably identified on the basis of the code. Increasingly, video data stored in such video data memories are to be processed further digitally. This is usually carried out in computer systems, for example also in personal computer systems. The problem then arises that the operating systems of such computer systems cannot work with the characterizing codes by means of which the video data is characterized in the video data memory, or are incapable of evaluating these codes.

Solutions have been proposed, this problem that eliminate by the video data being read out without characterizing codes from the video data memory and are buffered again in a further memory, for example the memory of a computer by means of which the data are further processed. The data are each provided with a new code in this buffer storage, i.e. a code which can be processed by the computer which is to process the data further. This procedure has the disadvantage that a buffer storage of the video data is required before this data can be further processed by a computer.

SUMMARY OF THE INVENTION

It is an object of the invention to provide a method of characterizing video data as well as a video data memory in which a buffer or intermediate storage of the video data is not necessary According to the invention, this object is achieved in that the characterizing code is converted into a video data code in accordance with which the video data is arranged in video data files for the purpose of access to the video data by external units, the names of said video data files comprising at least parts of the respective associated characterizing codes, and in which the video data files are arranged in directories which contain at least parts of the respective associated characterizing codes.

The video data must be individually characterized so that external units, in particular computers, are capable of accurately accessing the video data. To achieve this, a characterizing code provided in the video data memory, which is usually a time code, is replaced with a new video data code. This conversion is effected only for external units; the characterizing code or time code continues to be used in the video data memory itself, since this is usually the only possibility in such an appliance. For external units, however, this code is converted into the video data code, which is so designed that it can be processed by the processing systems of the external units. As a result, the video data in the video data memory seem to be characterized, in the eyes of the external units, not by the characterizing code or time code, but by the video data code. The external units are capable of accurately accessing certain video data on the basis of the video data code.

The video data code is so designed in this case that the video data are arranged in video data files. Such files have a format which operating systems of connected computers are capable of reading. To identify the video data, the names of the video data files comprise portions which contain elements of the characterizing codes with which the video data are stored in the data memory. A cross-reference between the characterizing code and the video data code is thus always possible in the video data memory. The data files are arranged in directories which also contain elements of the characterizing codes. A file/directory system is thus created which can be read on the one hand by the external units, while on the other hand it is generated inside the video data memory from the characterizing code. A link between the video data code and the characterizing code is possible at all times as a result of the method of characterizing of the data files and directories.

In an embodiment of the invention, said method, in which a time code is used as the characterizing code, is characterized in that a file name is generated for the video data code for each partial frame of the digital picture signal, which name has the format DDHHMMSSFFLL.xxx, in which DD represents the day, HH the hour, MM the minute, SS the second, FF the full frame, and LL the partial frame values of the time code.

A time code is used in the characterizing codes which are most widely used in video data memories, such that each partial frame from a picture sequence of a digital picture signal is individually characterized. The time code then usually contains indications of the day, hour, minute, second, full frame, and partial frame values of the video data. An unequivocal characterization to below the frame level is made possible thereby. In the conversion of the characterizing code into the video data code according to the invention, the format of the latter, while readable to computers, can be so designed that it still contains elements of the time code. Thus an access to the corresponding values of the time code is also possible on the basis of the indications of the video data files in accordance with the video data code. The advantage remains, however, that the video data code is readable to external computers, i.e. to the operating systems thereof.

In a further embodiment of the invention, therefore, the data files in the video data code are arranged in a directory structure whose directory names comprise in downward hierarchical order day, hour, minute, second, full frame, and partial frame characteristics of the video data files.

Data files are usually arranged in a hierarchical directory structure in computer systems. This directory structure is utilized for the video data code such that higher-order directories or the names thereof contain, for example, elements of the day values of the time codes. In the next lower hierarchical level of the directory structure of the video data code, the directory names may advantageously comprise hour values. This is continued down to full frame or partial frame characteristics originating from the characterizing code, but converted into the directory structure of the video data code as elements of the directory names.

In a further embodiment of the invention, a computer connected to the network and capable of accessing the video data code is capable of changing the data file names provided in the video data code and/or of displacing data files provided in the video data code into other data file directories provided in the video data code, and an assignment table is created in this case, in which the changes are listed and in accordance with which the video data code for the relevant data files is made available in a changed form.

When the video data from the video data memory are read out and processed further by an externally connected computer on the basis of the video data code, there will often be a desire to change file names or to shift file names into other directories. This will always relate to the file names in accordance with the video data code, or the directory structure in accordance with this code. Since the characterizing code in the video data memory is a fixed item, it cannot be changed. A change of the characterizing codes in the video data memory is indeed not necessary in the method according to the invention, because the video data code is no more than a conversion of the characterizing code into an external code. Instead, therefore, an assignment table is made in which it is characterized which file names or directory names were changed by an external unit in the video data code. The name in accordance with this assignment table is subsequently issued as the video data code for these file names or directory names. This new video data code thus replaces that video data code which is normally derived from the characterizing code with which the data are stored in the video data memory.

A change of the video data code as regards file name changes or directory name changes is thus possible for external units, without the unchangeability of the characterizing code having any negative influence thereon.

The object defined above in relation to a video data memory, in which video data characterized by a characterizing code, preferably a time code, are preferably linearly stored, is achieved in that means for generating a video data code from the characterizing code are provided, which means transmit the video data code, in accordance with which video data code the video data are arranged in video data files, to external units, the names of said files comprising at least parts of the relevant associated characterizing codes, and in accordance with which video data code the video data files are arranged in directories which contain at least parts of the relevant associated characterizing codes.

Means for generating a video data code are provided in the video data memory. These means calculate the video data code from the characterizing code. This video data code is provided to external units instead of the characterizing code and characterizes the individual video data in an unequivocal manner.

The means accordingly serve to convert the characterizing code into the video data code, and vice versa. The video data code then is designed in the manner described above.

In a further embodiment of the invention in relation to the video data memory, it is provided that external units, especially those connected via a network, are capable of accessing the video data code and of changing file names provided in the video data code and/or shifting data files provided in the video data code into other file directories provided in the video data code, that the means for generating the video data code in this case make an assignment table in which the changes are listed, and that the means for generating the video data code provide the video data code for the relevant data files in a form changed in accordance with the assignment table.

If externally connected computers accessing the video data code change file names and/or directory names of this code, the means for generating the video data code will make an assignment table. It is indicated therein which new file names and/or directory names replace the original file names and/or directory names. A change in the characterizing code is not necessary as a result of this. When the video data code is subsequently made available, the changes in accordance with the assignment table are taken into account, so that file names and/or directory names were apparently actually changed, as seen by external units. In fact, the changes of the file names and/or directory names in accordance with the assignment table were taken into account only in the conversion of the characterizing code into the video data code.

BRIEF DESCRIPTION OF THE DRAWINGS

An embodiment of the invention will be explained in more detail below with reference to the drawing, in which.

DETAILED DESCRIPTION OF THE PREFERRED EMBODIMENTS

Figure 1:
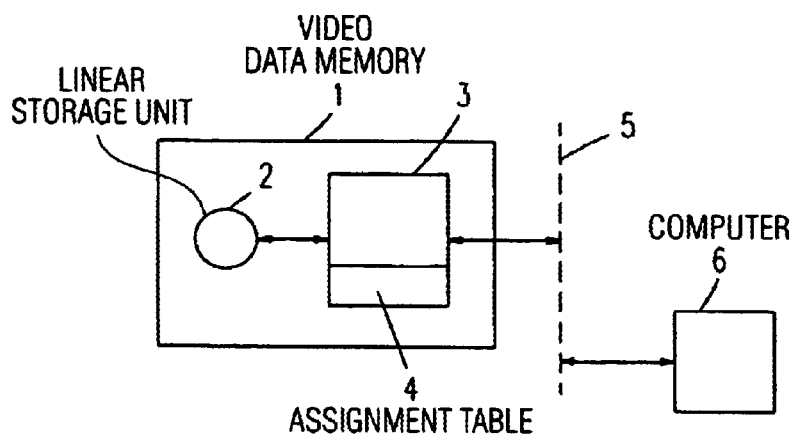
FIG. 1 shows a video data memory with means for generating a video data code.

FIG. 1 diagrammatically shows a video data memory 1 in which video data can be stored. This is done in a linear storage unit 2, which may be, for example, a magnetic tape or a storage disk. In this linear storage unit 2, the data are stored in a linear arrangement, i.e. the video data are stored one after the other in a fixed sequence at sub-picture level.

The video data is characterized by means of a characterizing code, which may be a time code in particular, in the linear storage unit 2. Such a time code characterizes the partial frames of the video data in an unequivocal manner. Usually, day, hour, minute, second, full frame, and partial frame values for the individual partial frames are included in the time code.

External units which are to read out the data from the video data memory 1 cannot read this time code in the situation in which these external units are computer-based units. To avoid a buffer or intermediate storage of the data, the video data memory 1 comprises means 3 for generating a video data code. The means 3 translate the time code with which the data are characterized in the linear storage unit 2 into a video data code. This video data code is supplied to external units via a data bus 5 which is diagrammatically indicated in the Figure. An external computer 6 can thus access the data arranged in the linear storage unit 2 via the data bus 5 and the means 3, said data being characterized not by means of the characterizing code or time code, but by means of the video data code generated by the means 3. As seen by the external computer 6, the video data now seem to be characterized by the video data code, which the computer 6 is capable of reading. The computer 6 may be used, for example, for further processing of the video data, i.e. for changing them, rearranging them, or the like.

There may be a wish in certain cases for the computer 6 to change the characterization of the video data, i.e. the video data code. Since the video data code comprises a structure of data file and directory names, the computer 6 can change the data file names and/or the directory names. In this case, the means 3 of the video data memory 1 make an assignment table 4 in which the changed file names and the original video data code are laid down.

As a result, the means 3 can then take into account these changed data file names and/or directory names in the generation of the video data code and issue the video data code in a modified manner in accordance with the assignment table.

The structure of the video data code and the manner of operation of the assignment table will be explained in more detail with reference to the next Figures.

Figure 2:
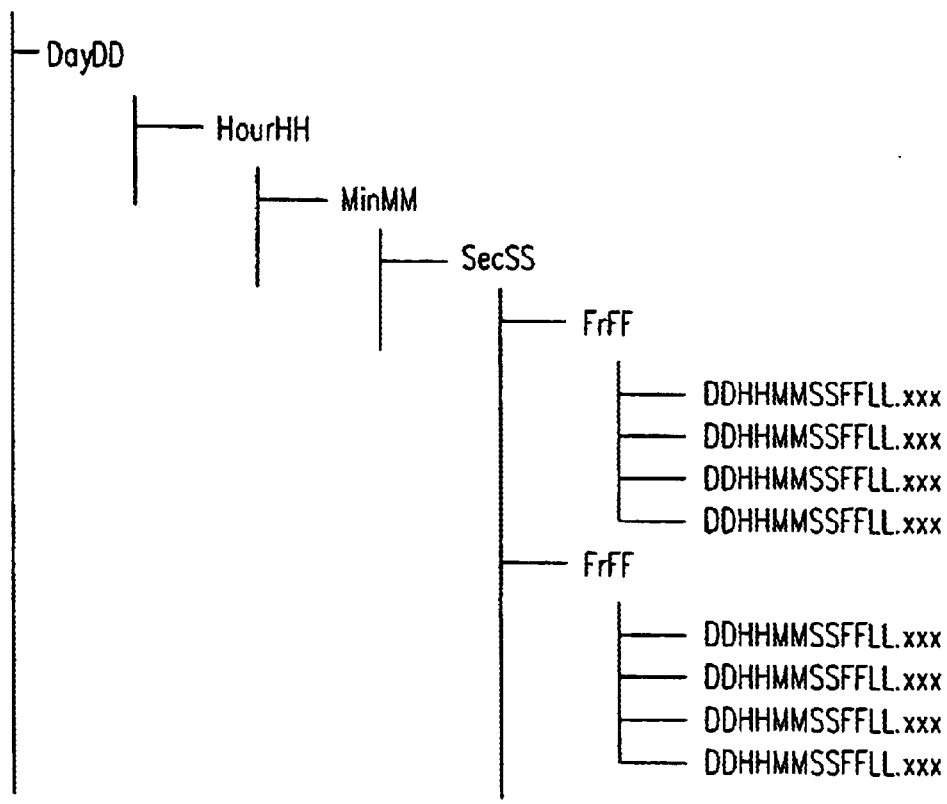
FIG. 2 shows an example of a directory and file name structure of the video data code.

FIG. 2 shows an example of a video data code such as it might be provided by the means 3 of the video data memory 1 of FIG. 1.

FIG. 2 shows a hierarchical directory structure in which the highest hierarchical level has the characteristic "DayDD". The characteristic "Day" indicates that this hierarchical level of the directory structure represents the day identifications of the characterizing code in the linear storage unit 2. The values "DD" here comprise the values of the time code in relation to the day. The directory structure, i.e. the directories of the further hierarchical levels contain the names "HourHH", "MinMM", "SecSS", and "FrFF".

A link to the characterizing code is possible at all times owing to these names of the directories in the directory structure. On the other hand, a directory structure is given which can be read by an external computer, i.e. by the operating system thereof, both as regards its structure and as regards its directory names.

The lowest hierarchical level of this directory structure contains directory names in which the full frame values in accordance with the characterizing code are contained in this example. The partial frames making up such a full frame or picture are then present in such a directory. In the example of FIG. 2, four partial frames make up one full picture each time, containing the characteristics in the structure "DDHHMMSSFFLL". These are indications on the day, hour, minute, second, full frame, and partial frame values in accordance with the characterizing code. File names of this kind are generated from the characterizing code and can be read by external computers. Further indicators are possible behind the dot in the file names in accordance with FIG. 2, which may be used in any manner as desired. They may be used, for example, for characterizing the kind of data, a further date, or the like.

The example given in FIG. 2 shows these directory name and file name structure in accordance with the video data code in a general example. In actual fact, the values DD, HH, MM, SS, FF, and LL in the video code are occupied by concrete number. An access to the video data stored in the linear data storage unit 2 of the device of FIG. 1 is thus possible on the basis of this video data code, although said video data are characterized by a different code, i.e. the characterizing code.

Figures 3, 4:
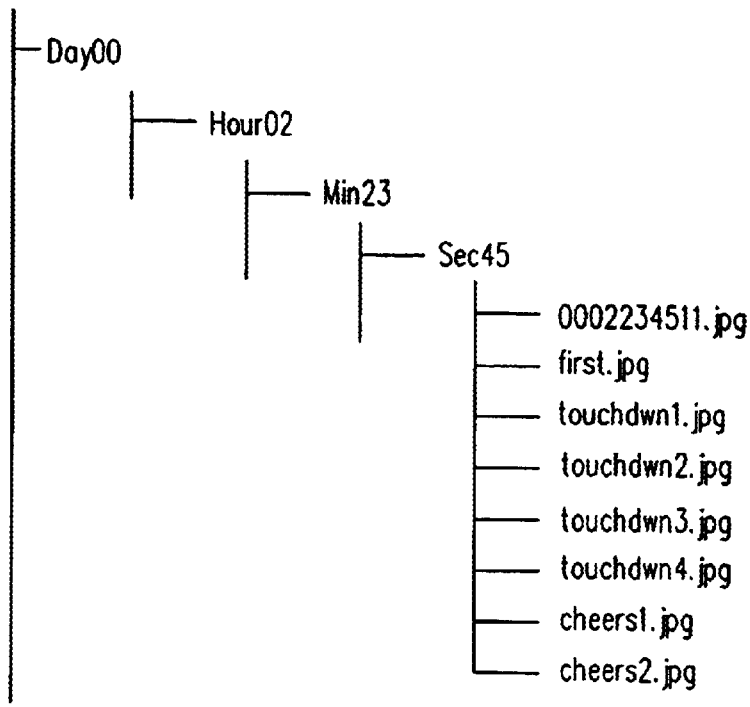
FIG. 3 shows an example similar to FIG. 2, with changed data file names.
FIG. 4 shows an example of an assignment table such as may be made in the video data memory of FIG. 1.

FIG. 3 shows an example of the video data code similar to the example of FIG. 2, but concrete values have now been inserted. In the example of FIG. 3, the day value is 00, the hour value 02, the minute value 23, and the second value 45. Pictures having a certain second value in accordance with the characterizing code are stored in a directory having this same second value in the present example. In the first file name shown in FIG. 3: "0002234511.jpg" within the directory "Sec45", a file name having the file name structure of FIG. 2 is chosen. This file name was accordingly derived from a characterizing code in which the day value is 00, the hour value 02, the minute value 23, the second value 45, and the frame value 11.

In a similar manner, the further file names in the directory "Sec45" were also originally characterized by the video data code.

These file names in accordance with the video data code have been changed, however, for example, by an external computer 6 corresponding to the representation of FIG. 1. The file names indicated in FIG. 3, for example "first.jpg" were chosen, replacing the original file names in accordance with the video data code.

The file names now appear in the new form as shown in FIG. 3 for the external computer; the file names have thus been seemingly changed.

In actual fact, the means 3 in the video data memory 1 of FIG. 1 have made an assignment table 4 in which it was indicated which original file names in accordance with the video data code have been replaced with which new file names. This will be explained further with reference to FIG. 4.

This FIG. 4 shows an example of an assignment table such as may be made, for example, by the means 3 of the video data memory 1 of FIG. 1.

The left-hand column "Video-Daten-Code" in the table contains those file names which the files originally had in the video data code.

In the right-hand column, we find next to the original file names of the left-hand column those names which were chosen by an external computer, i.e. which are to replace the original file names.

In the example of FIG. 4, the directory names in which the relevant file names are included have also been indicated in the right-hand column.

After such an assignment table similar to the one of FIG. 4 has been made, the file names which correspond to the right-hand column of the table are now made available in the video data code instead of the file names indicated in the left-hand column of the table. The file names thus seen to have changed, as seen by external units. In fact, the assignment table merely carries out a translation of the code into new file names.

The invention thus achieves that the video data stored in the linear storage unit 2 can be stored therein still with the unchanged characterizing codes, while they are nevertheless characterized by means of a video data code for external units which can read this video data code. In addition, this video data code is even changeable, so that a highly flexible operation by means of the external units is made possible.

What is claimed is:

1. A method of characterizing video data which are characterized in a video data memory; by means of a characterizing code, wherein the characterizing code is converted into a video data code in accordance with which the video data are arranged in video data files for the purpose of access to the video data by external units, the names of said video data files including at least parts of the respective associated characterizing codes, wherein the video data code includes directories for arranging the video data files in the directories which contain at least parts of the respective associated characterizing codes.

2. A method as claimed in claim 1, with a time code being used as the characterizing code, wherein a file name is generated for the video data code for each partial frame of the digital picture signal, which name has the format DDHHMMSSFFLL.xxx, in which DD represents the day, HH the hour, MM the minute, SS the second, FF the full frame, and LL the partial frame values of the time code.

3. A method as in claim 1, wherein the directories in the video data code are arranged in a director structure having directory names comprise in a downward hierarchical order day, hour, minute, second, full name, and partial frame characteristics of the video data files.

4. A method as claimed in claim 1, wherein the video data code is so designed that it corresponds to a file and directory code of computers which communicate with one another in a server-client network.

5. A method as claimed in claim 4, characterized in that a computer connected to the network and capable of accessing the video data code is capable of changing the data file names provided in the video data code, and in that an assignment table is created in this case, in which the changes are listed and in accordance with which the video data code for relevant data files is made available in a changed form.

6. A video data memory in which video data is stored, said data being characterized by means of a characterizing code comprising means (3) for generating a video data code from the characterizing code, which means transmit the video data code, in accordance with which video data code the video data are arranged in video data files, to external units (6), the names of said files including at least parts of the relevant associated characterizing codes, wherein the video data code includes directories for arranging the video data files in the directories which contain at least parts of the relevant associated characterizing codes.

7. A video data memory as claimed in claim 6, wherein the external units (6), especially those connected via a network (5), are capable of accessing the video data code and of changing file names provided in the video data code, in that the means (3) for generating the video data code in this case make an assignment table in which the changes are listed, and that the means for generating the video data code provide the video data code for the relevant data files in a form which has been changed in accordance with the assignment table (4).

8. A method as claimed in claim 1, wherein the video data memory is a linear data memory.

9. A method as claimed in claim 4, wherein a computer connected to the network is capable of displacing data files provided in the video data code into other data file directories provided in the video data code.

10. A video data memory as claimed in claim 6, wherein the video data memory is linearly stored.

11. A video data memory as claimed in claim 6, wherein the characterizing code is a time code.

12. A video data memory as claimed in claim 7, wherein the external units (6) are capable of shifting data files provided in the video data code into other file directories provided in the video data code.

* * * * *